United States Patent [19]

Geary, Jr. et al.

[11] 4,399,651

[45] Aug. 23, 1983

[54] METHOD FOR STARTING AN FCC POWER RECOVERY STRING

[75] Inventors: Carl H. Geary, Jr., Greensburg, Pa.; Norman A. Samurin, Houston, Tex.

[73] Assignee: Elliott Turbomachinery Co., Inc., Jeannette, Pa.

[21] Appl. No.: 267,936

[22] Filed: May 28, 1981

[51] Int. Cl.$^{3}$ .......................... F02G 3/00; F02C 7/26

[52] U.S. Cl. ................................ 60/39.02; 60/39.141

[58] Field of Search ............ 60/39.02, 39.03, 39.14 R; 415/11, 27-28, 47; 208/130; 252/417

[56] References Cited

U.S. PATENT DOCUMENTS

| | | | |
|---|---|---|---|
| 3,047,210 | 7/1962 | Best | 415/27 |
| 3,076,769 | 2/1963 | Pfeiffer | 252/417 |
| 3,473,727 | 10/1969 | Eastman | 415/27 |
| 4,230,437 | 10/1980 | Bellinger et al. | 415/11 X |
| 4,248,055 | 2/1981 | Day et al. | 62/196 C |

*Primary Examiner*—L. J. Casaregola
*Assistant Examiner*—Timothy S. Thorpe
*Attorney, Agent, or Firm*—Donald F. Daley; David J. Zobkiw

[57] ABSTRACT

The load on the starting steam turbine or motor which drives the power recovery string of an FCC process is reduced on the order of 15% by increasing the specific volume of the air compressed by a fixed volume compressor in the string. The specific volume of the ambient air is increased by returning a portion of the compressed and thereby heated air to the inlet of the compressor in amounts sufficient to raise the temperature of the inlet air about 75° F., or more.

6 Claims, 1 Drawing Figure

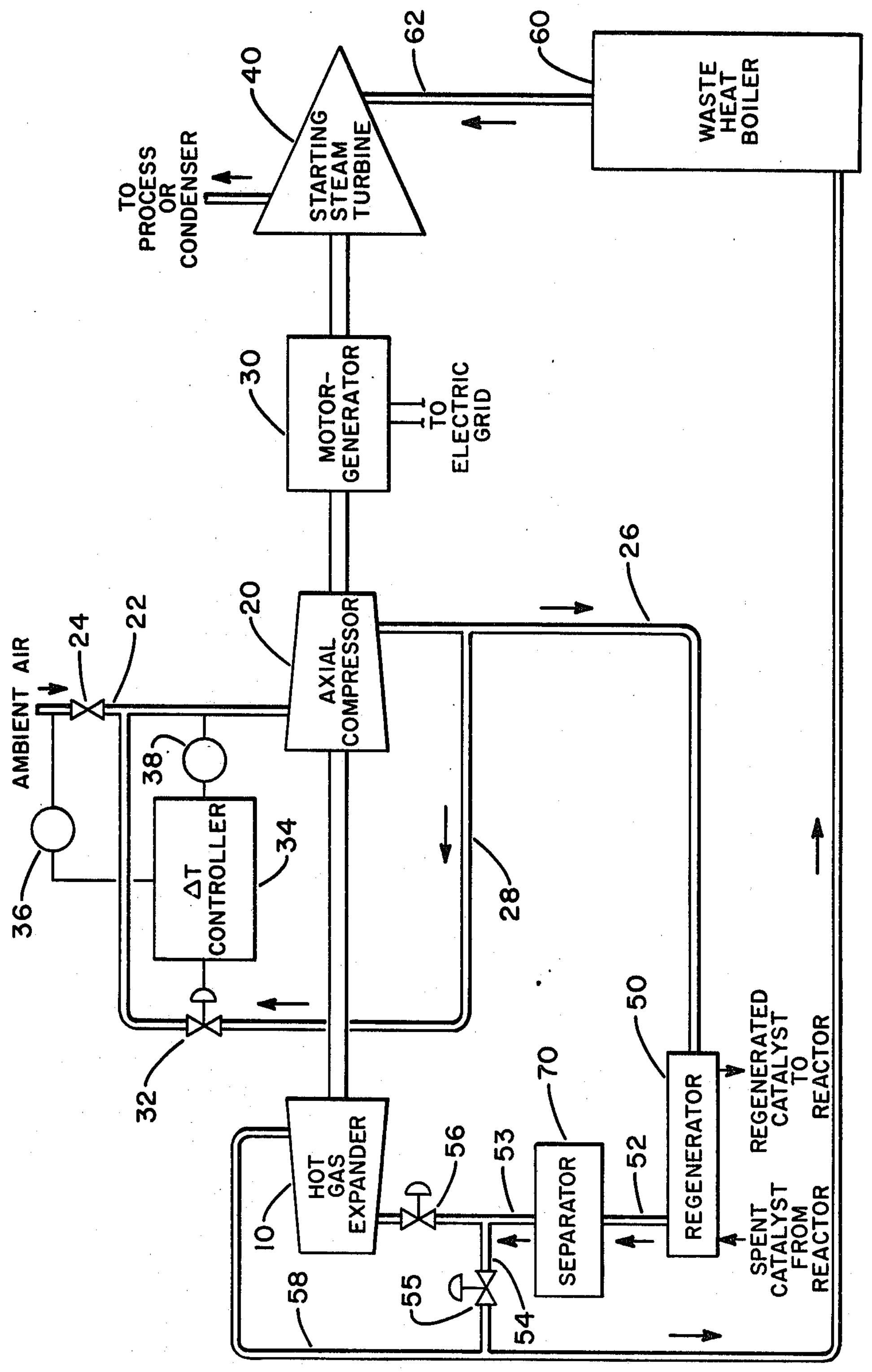
WASTE HEAT BOILER
60
62
40
STARTING STEAM TURBINE
TO PROCESS OR CONDENSER
30
MOTOR-GENERATOR
TO ELECTRIC GRID
26
20
AXIAL COMPRESSOR
22
24
AMBIENT AIR
38
34
ΔT CONTROLLER
36
28
32
50
REGENERATOR
REGENERATED CATALYST TO REACTOR
SPENT CATALYST FROM REACTOR
70
SEPARATOR
52
53
56
HOT GAS EXPANDER
10
55
54
58

METHOD FOR STARTING AN FCC POWER RECOVERY STRING

BACKGROUND OF THE INVENTION

The power recovery string of a fluid catalytic cracker (FCC) process typically includes a hot gas expander or turbine, an axial air compressor, a motor/generator and a starting steam turbine. The machines are connected in axial alignment so that the power shaft of each serves as an extension of the other and they turn as a unit. In a fully operating FCC system, the hot products of combustion from a regenerator vessel are supplied to the hot gas expander for power recovery before being supplied to a boiler for the generation of steam. The hot gas expander drives the axial air compressor which compresses ambient air and supplies it to the regenerator vessel as combustion air for burning off the carbonaceous coating which forms on the catalyst. The hot gas expander also drives the motor/generator to supply electrical power to other parts of the plant or to the electric grid.

The starting steam turbine is operatively coupled to the power recovery string for driving the axial compressor during start up of the power recovery string, when the hot gas expander is down for repairs or the like, and when there is insufficient hot gas for the expander. The motor/generator is also capable of driving the axial compressor either alone or in combination with the starting steam turbine and/or the hot gas expander. During a start up period, the hot gas expander is gradually brought up to operating temperature at a rate of 100° to 200° F./hour by gradually supplying hot regenerator gas thereto. When the hot gas flow to the expander increases to the point where it is able to overcome the parasitic losses which have an equivalent load, typically, of about 2000 horsepower, the expander assists the steam turbine and/or the motor/generator in driving the compressor. The axial compressor is inherently a constant volumetric device and therefore the load it provides is a function of the density of the ambient air being compressed and supplied to the regenerator vessel.

The total FCC system including the regenerator, separator, reactor and piping is dried out by passing hot gas therethrough. The catalyst is loaded prior to starting up the cracking operation.

When the FCC system components have been sufficiently dried, torch oil is introduced into the regenerator for additional dry out. The catalyst is then introduced and crude cracking begins. Gradually, the pressure is built up in the regenerator and the hot gasses are supplied in part to the hot gas expander. The rest of the hot gasses are bypassed to the waste heat boiler until the hot gas expander is fully operative. At that point, the hot gas expander will drive the compressor and the motor/generator will be driven as a generator. The starting steam turbine will free wheel so as to be able to drive the compressor if the hot gas expander goes off line or is running at reduced power.

SUMMARY OF THE INVENTION

The starting steam turbine is often sized and selected to meet the minimum design needs or with the idea that the motor will supplement the steam turbine during startup. The steam turbine is used initially to overcome the parasitic losses. Once the turbine reaches a predetermined load/speed combination, the motor/generator may be energized to bring the string up to speed. This minimizes the instantaneous current demand which would be highest if the string was started from rest by the motor/generator. Since utilities use instantaneous demand as a pricing factor, it would be very expensive, relatively, to use the motor for the initial start up. A combination of the motor and steam turbine run the FCC at part load during the start up or at full load if there is not enough waste heat to run the steam turbine or if the hot gas expander is down while the regenerator is operative and requiring the combustion air supplied by the axial compressor. Because the load on a constant volumetric device such as the axial compressor of the power recovery string varies inversely as the absolute temperature of the inlet air, the load can be reduced by raising the temperature of the inlet air. Also the increased load during start up on a very cold day can be minimized so that the design pressure ratio is achieved. The present invention reduces the size of the required start up turbine by returning part of the air heated by compression to the inlet of the compressor to thereby effectively raise the inlet temperature of the compressor and reduce the mass of air compressed. This is so because if the temperature is increased at constant pressure, the specific volume increases which means that the mass flow can be reduced at constant volume flow, thereby reducing the horsepower requirement. Since a typical start up steam turbine is on the order of 12,000 horsepower, mass reduction through a temperature increase of the inlet air can produce significant absolute power load reduction.

It is an object of this invention to provide a method and apparatus for reducing the compressor load during start up of the regenerator of an FCC process.

It is an additional object of this invention to permit starting an FCC process under off-design conditions such as very low ambient temperature.

It is a further object of this invention to reduce starting horsepower requirements in a power recovery string, by reaching compressor head with higher specific volume air. These objects and others as will become apparent hereinafter, are accomplished by the present invention.

Basically, the present invention reduces the starting load presented by a constant volumetric device by raising the specific volume of the gas being compressed. The increase in the specific volume is achieved by bypassing a portion of the compressed gas, which is heated as a byproduct of compression, to the inlet of the compressor where it raises the temperature and therefor the specific volume of the ambient air supplied to the inlet of the compressor. Control is achieved by a differential temperature controller which controls a valve in the bypass line to maintain a predetermined difference between the ambient temperature and the temperature of the mixture supplied to the compressor inlet.

BRIEF DESCRIPTION OF THE DRAWING

For a fuller understanding of the present invention, reference should now be made to the following detailed description thereof taken in conjunction with the accompanying drawing wherein:

The FIGURE is a schematic representation of an FCC power recovery string employing the present invention.

DESCRIPTION OF THE PREFERRED EMBODIMENT

Referring to the FIGURE, the power recovery string for an FCC power recovery string serially includes hot gas expander 10, axial compressor 20, motor/generator 30 and starting steam turbine 40. In the FCC process the catalyst becomes coated with coked carbonaceous material which is supplied to the regenerator 50. With the regenerator charged with spent catalyst the start up procedure for the power recovery string takes place over a couple of days during which the regenerator is slowly brought up to temperature. Steam produced in the waste heat or CO boiler 60 is supplied via line 62 to starting steam turbine 40. Initially, however, the steam could come from another convenient source. The steam acting on turbine 40 starts the string rotating thereby overcoming the parasitic losses. Motor/generator 30 and hot gas expander 10 are initially free wheeling while axial compressor 20 draws ambient air in at line 22 and compresses and thereby heats the air which is then delivered via line 26 to the regenerator 50. Motor/generator 30 may be started once the parasitic losses are overcome. Additionally, in accordance with the teachings of the present invention, a bypass line 28 is provided between line 26 and line 22 at a point downstream of check valve 24. Valve 32 is provided in line 28 to regulate the amount of air fed back to the inlet of compressor 20 and for expanding the compressed air, at constant temperature, back to subatmospheric pressure so that check valve 24, and its resulting pressure drop, can be eliminated, if desired. Valve 32 is controlled by the differential temperature controller 34 which receives a signal indicative of the ambient air temperature from temperature sensor 36 and a signal indicative of the temperature of the air supplied to the compressor 20 from temperature sensor 38. A suitable differential temperature controller is the Model 444 "Alpha Line" manufactured by Rosemount Company of Minneapolis, Minn. Valve 32 is typically controlled to initially achieve a 75°-100° F. difference in the temperatures sensed by sensors 36 and 38, respectively. In a typical installation, the maximum temperature rise in the air passing through the compressor 20 is on the order of 300° F. Since the drying process in the regenerator 50 does not necessarily require the full output of the compressor 20, a part of the air can be bypassed, but it will slow the drying process. By bypassing sufficient air to raise the inlet temperature of the ambient air 75°-100° F., the horsepower requirement for the steam turbine 40 and/or motor/generator 30 is reduced about 15%. Hot gas leakage and windage initially heat the hot gas expander 10 but near the end of the start up period butterfly valve 56, which is under regenerator pressure control, is regulated to bring expander 10 up to full operating temperature. The air supplied to the regenerator 50 in the drying of the system is exhausted via line 52 into separator 70 which removes particulate matter. The scrubbed air then passes via line 53 and branch line 54 to valve 55 which is under regenerator pressure control and then via line 58 to CO or waste heat boiler 60 as fuel and combustion air for the production of steam for steam turbine 40 as well as for other process uses.

When the system has dried sufficiently, torch oil is supplied to the regenerator 50 and lit. When cracking begins in the reactor, coke is formed on the catalyst, and with combustion air from the compressor 20 supporting combustion, the carbonaceous coating is burned off in the regenerator 50 in an excess oxygen environment to prevent carbon monoxide afterburn in expander 10. The pressure in the regenerator 50 is gradually built up while supplying a portion of the combustion products to the boiler 60, without passing through expander 10, and passing part of the combustion products via line 52, separator 70, line 53 and valve 56 to the hot gas expander 10 before being supplied to the boiler 60 via line 58. When the gas flow through hot gas expander 10 is sufficient to overcome the parasitic losses of the hot gas expander, about 2000 horsepower, the expander 10 will pick up the string load to help to drive the compressor 20. In this way the string can be bootstrapped to full load since as less air is bypassed by the compressor 20 when the string and regenerator approach full load, more hot gas is supplied to the hot turbine expander to help to drive the axial compressor. The reduction of bypassed air is, typically, achieved by manual control of valve 32 and/or differential temperature controller 34.

Once full load is reached, the compressor 20 will be driven by the expander 10 and the turbine 40 will free wheel so as to be ready to takeover driving the compressor 20 if the expander 10 goes off line. At full load, the axial compressor 20 will not be bypassing any air. The motor/generator 30 will be operated as a generator if there is sufficient capacity in the expander 10 in excess of that required by the compressor 20.

The start up procedure described above employs the teachings of the present invention to reduce the load on the starting steam turbine 40 to permit starting at off design conditions such as lower ambient temperature or, alternatively, to permit the specifying of a smaller turbine. A string may be started under other conditions under which the teachings of the present invention can be beneficially employed.

To reduce the size of the steam turbine 40, the initial string design can require the use of the motor/generator 30 in the motor mode to help the steam turbine 40 bring the string up to speed. In this case, the load factor associated with the running of the motor/generator 30 in the motor mode for the extended period of string start up can be reduced by bypassing part of the air to heat the ambient air entering the compressor. This is so because in this manner the load on the motor 30 can be reduced and thereby the load factor.

Another presumption in the above descriptions was that there was sufficient waste heat steam to run the turbine which is not necessarily the case. The waste heat boiler 60 is fueled by gases from the regenerator 50 and this may be supplemented with other fuel gas as available. If, however, there is not enough waste heat to start the string, the motor/generator 30 may initially be used to start the string. As in the other cases, air would be bypassed in the compressor 20 to raise the ambient air temperature at the compressor inlet and reduce the load. The particulate laden drying gas will then be passed from the regenerator 50 via line 52, to separator 70, and the scrubbed gas will pass via line 53, line 54, valve 55 and line 58 to fuel the waste heat boiler 60 which will be used to produce steam to drive turbine 40 which will take over for the motor 30 to drive compressor 20 and the start up process will then continue as in the other cases.

Although a preferred embodiment of the present invention has been illustrated and described, other changes will occur to those skilled in the art. For example, other methods of raising the inlet air temperature, such as heat exchange, can be employed in lieu of bypassing a portion of the compressor output. Also, the disabling of the differential temperature controller can be programmed or initiated in response to a system condition such as regenerator pressure, rotational speed of the string, etc. It is therefore intended that the scope of the present invention is to be limited only by the scope of the appended claims.

What is claimed is:

1. A method for starting a power recovery string of a fluid catalytic cracker system where the string includes an expander means, constant volume compressor means and driving means, including the steps of:

rotating the power recovery string by means of the driving means to cause the compressor means to draw in ambient air which is compressed and heated thereby;

delivering at least a portion of the compressed, heated air from the compressor means to a catalytic regenerator means for initially drying the fluid catalytic cracker system and subsequently supporting combustion in the regenerator means;

expanding at constant temperature and delivering a portion of the compressed, heated air from the compressor means back to the inlet of the compressor means for at least a portion of the startup period to raise the temperature and thereby increase the specific volume of the ambient air supplied to the compressor means which reduces the power load on the driving means;

increasing the rotational speed of the power recovery string;

igniting the dried, spent catalyst in the regenerator means to produce hot combustion products which are used to drive the expander means and thereby the power recovery string; and concurrently bringing the power recovery string up to speed, disabling the driving means and stopping the delivery of expanded, heated air back to the inlet of the compressor means.

2. The method of claim 1 wherein the step of delivering a portion of the expanded, heated air from the compressor means back to the inlet of the compressor means initially delivers enough heated air to raise the temperature of the ambient air about 75° F., or more.

3. A method for reducing the load on the starting means of a power recovery string including a constant volume compressor means and a normal driving means including the steps of:

rotating the power recovery string by means of the starting means to cause the compressor means to draw in ambient air which is compressed and heated thereby;

expanding at constant temperature and delivering a portion of the compressed, heated air from the compressor means back to the inlet of the compressor means for at least a portion of the start up period to raise the temperature and thereby increase the specific volume of the ambient air supplied to the compressor means which reduces the load on the starting means;

increasing the rotational speed of the power recovery string;

activating the normal driving means; and concurrently bringing the power recovery string up to speed, disabling the starting means and stopping the delivery of expanded, heated air back to the inlet of the compressor means.

4. The method of claim 3 wherein the step of delivering a portion of the expanded, heated air from the compressor means back to the inlet of the compressor means initially delivers enough heated air to raise the temperature of the ambient air about 75° F., or more.

5. The method of claim 3 further including the steps of:

sensing the temperature of the ambient air;

sensing the temperature of the expanded, heated air;

comparing the sensed temperatures, and controlling the delivery of expanded, heated air in response to the step of comparing the sensed temperatures.

6. The method of claim 1 further including the steps of:

sensing the temperature of the ambient air;

sensing the temperature of the expanded, heated air;

comparing the sensed temperatures, and controlling the delivery of expanded, heated air in response to the step of comparing the sensed temperatures.

* * * * *